US007607469B2

(12) United States Patent
Aragones Martinez et al.

(10) Patent No.: US 7,607,469 B2
(45) Date of Patent: Oct. 27, 2009

(54) SYSTEM FOR GLUING BAGS COMPRISING MULTIPLE SHEETS

(76) Inventors: Rafael Aragones Martinez, 25 Highland Park Village, Dallas, TX (US) 75205; Gonzalo Aragones Martinez, 25 Highland Park Village, Dallas, TX (US) 75205

( * ) Notice: Subject to any disclaimer, the term of this patent is extended or adjusted under 35 U.S.C. 154(b) by 362 days.

(21) Appl. No.: 10/579,031

(22) PCT Filed: Oct. 19, 2004

(86) PCT No.: PCT/ES2004/000450

§ 371 (c)(1), (2), (4) Date: May 11, 2006

(87) PCT Pub. No.: WO2005/046885

PCT Pub. Date: May 26, 2005

(65) Prior Publication Data

US 2007/0084403 A1 Apr. 19, 2007

(30) Foreign Application Priority Data

Nov. 13, 2003 (ES) ............................ 200302614 U
Sep. 14, 2004 (ES) ............................ 200402108 U

(51) Int. Cl.
*B29C 65/48* (2006.01)
*B05C 1/02* (2006.01)

(52) U.S. Cl. ........................ 156/578; 156/582; 118/255

(58) Field of Classification Search ................. 156/290, 156/291, 295, 305, 307.4, 314, 578, 580, 156/581, 582; 118/244, 255; 427/207.1, 427/208.6, 428.01, 428.08
See application file for complete search history.

(56) References Cited

U.S. PATENT DOCUMENTS 3,269,643 A * 8/1966 McDowell .................. 383/111

FOREIGN PATENT DOCUMENTS

WO WO 03086744 A1 * 10/2003

* cited by examiner

*Primary Examiner*—Philip C Tucker
*Assistant Examiner*—Sing P Chan
(74) *Attorney, Agent, or Firm*—Defillo & Associates, Inc; Evelyn A. Defillo

(57) ABSTRACT

The invention relates to an improved system for gluing the bottoms of bags. The inventive system comprises a block which is used to glue the bottom-forming flaps and which is equipped with a relief. The relief is formed by a series of parallel rows which are disposed longitudinally in the direction of rotation of the gluing roller and which determine the same number of ridges as rows, having corresponding grooves therebetween. In this way, only the ridges are impregnated when adhesive is spread on the block, such that parallel lines of glue are applied to the flaps. In addition, the same block is used to glue a reinforcing strip to the bottom of the bag that has been formed by folding and gluing the above-mentioned flaps, such that the glue is applied in parallel lines. The glue-applicator points, which are used to apply dots of glue between the bag-forming sheets, are equipped with an improved application face which prevents the build-up of glue on the walls of the glue-applicator point.

8 Claims, 4 Drawing Sheets a b c d

SYSTEM FOR GLUING BAGS COMPRISING MULTIPLE SHEETS

OBJECTIVE OF THE INVENTION

The present invention refers to a system which permits an improvement in the gluing of paper bags and sacks comprised of several layers or sheets, and especially, for gluing the bottoms of the sacks and bags.

The objective of the invention is a glue applicator plate used for the gluing of the bottom of the bags, and specifically, a raised or embossed said gluer which prevents the glue from coming off at high speeds.

Also, the objective of the invention is the configuration of the gluing points utilized for the application which keeps the sheets intact during the process of forming the bottom.

With the proposed system one achieves a better distribution of the glue with less spattering that consequently leads to greater glue consumption, with quicker drying time and, therefore, an increase in production.

BACKGROUND OF THE INVENTION

The paper bags or sacks composed of various sheets or layers are formed from rolls of paper, or sometimes from plastic materials, in two principal stages: a first stage of formation of a tubular surface open at its outer walls and a second stage of formation of the bottoms, therefore, the sack or bag.

In the first stage, points of glue are applied on the edges of the sheets. This gluing is necessary to keep the sheets together, constituting the bag or sack, during the operations of folding and gluing the bottoms.

The gluing is applied on the longitudinal edges of the sheets in order to create a closed tubular surface.

In the second phase, the formation of the bottom of the bags is obtained by folding and gluing the clearly defined flaps on the outside of the tubular surface.

In gluing the bottoms of the bags, first fold the edges of the tube to define the flaps, of which one flap has glue applied. Next, fold again on the flaps in such a way that they remain superimposed and stuck to each other. It is usual to apply a glued strip of paper on the flaps, which acts as a strengthener.

In order to produce the folds necessary for the shaping of the bottom, suction pads are used to lift up the tube, resulting in the separate sheets to be joined together by the glue. These points of gluing are the ones mentioned initially, as the process of the shaping of the bags is applied.

Transfer rollers are used, to conduct the adhesive to a roller applicator which has on its surface a plate or special band of rubber or a similar rough surface, containing small cells in which the glue is deposited and transferred to the flaps of the paper sheets for their closure, shaping the bottom of the bags.

When large quantities of the flaps for the bags are glued, you have to increase the speed of rotation of the roller applicator but, due to the morphology of the surface of the plate, may lose some of the glue due to the increase in speed.

In order for the gluing points to keep the sheets of paper together, the gluing machines have roller applicators with ruler guides to correctly set the glue points to apply the glue in the front and back openings of the different layers and sheets.

The gluing points are of rubber, plastic or metal and generally present a circular, elliptical or rectangular configuration.

These gluing points can either form part of the ruler guide or constitute independent pieces which are connected to the ruler guides by a support equipped with a lower shaft which is threaded around the said power strip and an upper shaft which is threaded around the glue point.

The configurations described above present an inconvenience when the glue accumulates on the walls of the glue point and the un-transferred glue comes off during the turning of the roller, producing unwanted spattering. On other occasions, the glue dries around the gluing points, gradually increasing the transfer surface, producing an unnecessary expense and increasing the humidity in the bag.

DESCRIPTION OF THE INVENTION

The system of the gluing objective of the invention, resolves the problem mentioned for the bottoms of the bags, in that it refers to the flaps and the strengthening strips on the bottom, as well as the glue between the different sheets of each bag which allows the anchoring or shaping of the bottom.

The plate for the gluing of the flaps of the paper bags or sacks which constitutes the objective of the invention is of plastic or a similar material and shows a special embossment on its surface which allows it to resolve current problems.

Specifically, the embossment of the surface of the plate is formed by a series of parallel rows which conform to a series of crests, among which are defined as corresponding valleys or grooves, in a way that the glue is impregnated only on the crests, avoiding its removal at high speeds from the rotation of the roller. The rows of crests are arranged with a longitudinal orientation in the direction of the rotation of the roller applicator.

In this way, the glue is applied forming a series of parallel lines, whose distance comes determined by the separation among the crests and which can vary according to the type of glue used and the required necessities. The cleaner the glue the greater its grip in dampness, and the better results that are obtained.

This morphology permits a better distribution and saving of glue with much less spattering, because the drying is faster and therefore productivity can be increased and the time of delivery of the bags obtained can be reduced.

The crests can present different configurations, such as triangular profiles, corrugated, square, and slender.

Special configurations have also been planned, for example, parallel rows of pairs of truncated conical protuberances which allow less glue to be used. Moreover, this configuration permits the glue on the plate to remain at the machine stops, in such a way that upon restarting the motion, the gluing is produced on the bottoms without interruption or on areas lacking in glue.

As soon as the glue is placed between the sheets that constitute the bag, some gluing points are used whose design facilitates the impregnation of the glue and its application in the shaping of the bags avoiding the accumulation of the same.

Specifically, when the gluing point is metallic, an essentially triangular configuration is anticipated, and the gluing point remains arranged on the corresponding interlinear spaces oriented in such a way that one of the vertices of the triangle might remain facing the direction of the glue.

In accordance with the objective of the invention, the gluing point can be with a canal or a longitudinal groove going through the central part to improve the evacuation of the glue.

When the gluing points are of rubber or plastic, a configuration in the circular sector is anticipated, and the vertex remains facing in the direction of the glue. This circular sector can also incorporate a central groove similar to the one described previously.

The gluing points of rubber or plastic can also present a configuration of a circular segment, of reduced thickness, which remains facing the glue through its curved edge which presents less resistance.

DESCRIPTION OF THE DRAWINGS

To complement the description that is being done and with the objective of creating a better understanding of the characteristics of the invention, in accordance with the practical example of the preferred embodiment of the same, a set of drawings is included and represented as follows.

PREFERRED EMBODIMENT OF THE INVENTION

Figure 1:
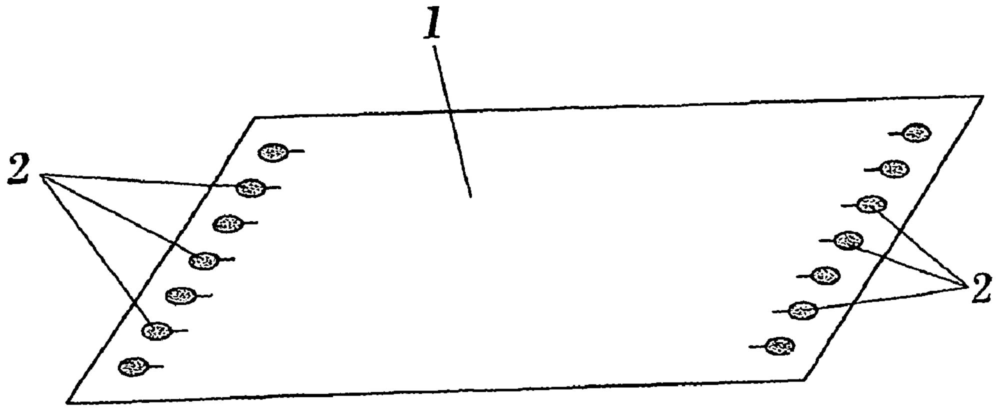
FIG. 1.—Shows some of the stages of the shaping of a sack or bag with multiple sheets.
Figure 1:
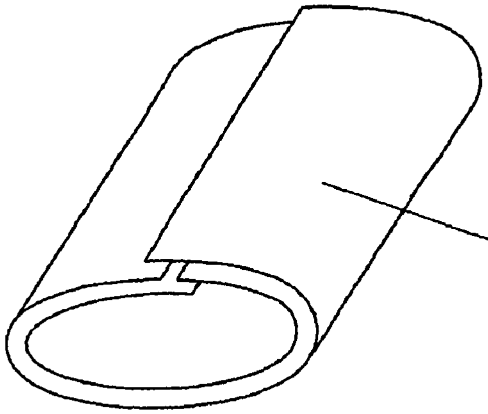
Figure 1:
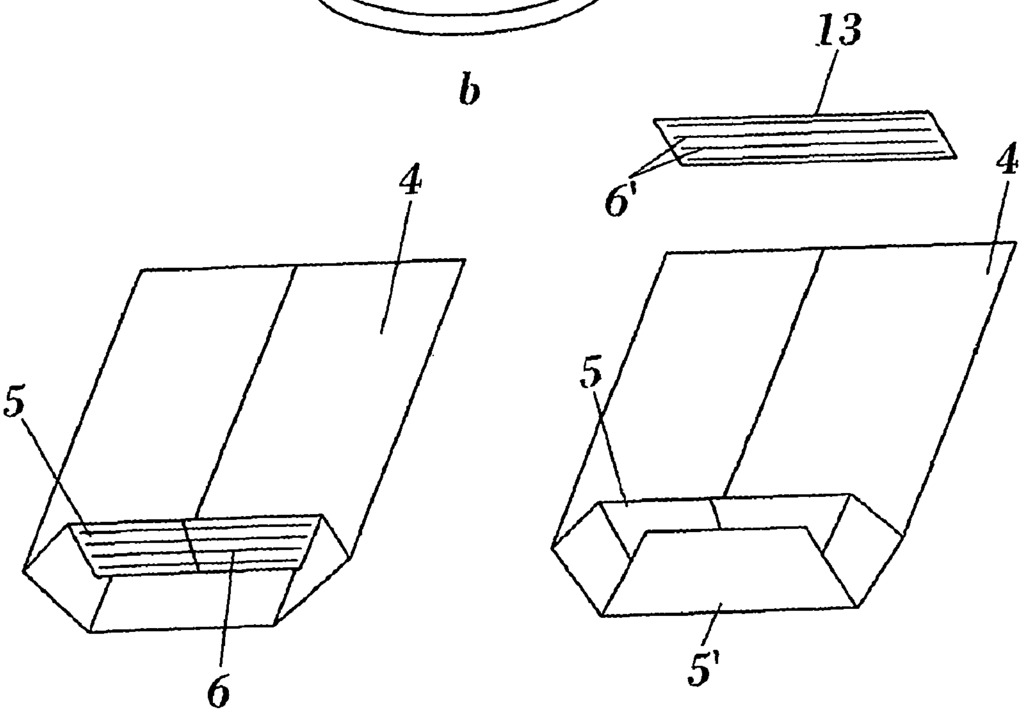

In FIG. 1 a bag of multiple sheets is represented in distinctive phases of its shaping and, especially, the following:

a—A sheet of paper (1), after the glue is applied on its outer edges. On this sheet is placed another sheet of paper, keeping both together by means of said points of glue (2), in order to permit the posterior gluing of the bottoms. This glue is applied by means of the gluing points (See FIG. 4) which are the objective of the invention.

b—A bag (4), once applied a line of glue longitudinally on both sheets, getting an open tubular configuration by their outer walls.

c.—A bag (4), once configured one of the flaps(S) of the bottom and the corresponding glue applied (6) on the same. This glue is applied by means of a plate (7), an objective of the invention d.—A bag (4), once the two flaps (5)(5') are glued together between themselves, constituting the bottom, and on which is going to be glued a reinforcement strip (13) on which a layer of glue is applied (6') by means of the plate (7), an objective of the invention.

Figure 4:
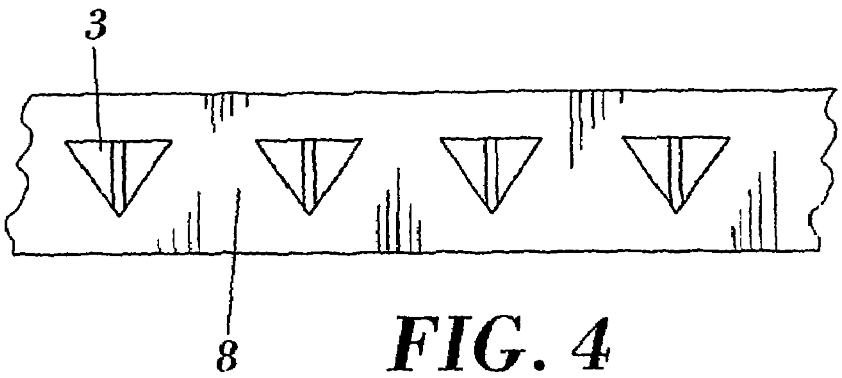
FIG. 4.—Shows a plan view of a power ruler guide in which the gluing points of the multiple sheets are arranged which constitutes the bag; some gluing points of triangular configuration having been represented.

The gluing points (3), represented in FIG. 4 permit the gluing of the multiple sheets (1) that constitute the bag (4) to each other and, just like it is represented in FIG. 4, they are mounted on a ruler guide (8) which at the same time are arranged on a roller applicator; the gluing points (3) being able to be mounted on the ruler guide (8) in an interchangeable way, by means of the corresponding threaded support.

The gluing points (3) objective of the invention can present different configurations depending on the material used. For example, just like it is represented in FIG. 5, the metallic gluing points present a geometry essentially triangular and which are arranged on the ruler guide (8) in such a way that one of its vertices remains facing the direction of the glue, as can be observed in FIG. 5.

Figure 6:
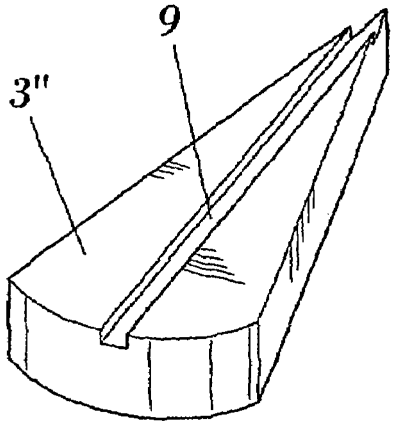
FIG. 6.—Shows a perspective view of a possible geometric configuration of the gluing points of the multiple sheets which make up the bag, and specifically, of a gluing point in a circular sector.

The gluing points of rubber or plastic are constituted in the form of a circular sector (3) with its vertex facing in the direction of the glue, as represented in FIG. 6.

It has also been anticipated that the gluing points of rubber or plastic might present a geometry in semi-circular segment (3'''); the semi-circular segment remaining in vertical position on the ruler guide (8) by means of its rectangular base. The semi-circular segment remains in vertical position on the ruler guide by standing on the rectangular base. The rectangular base having approximately 2 mm. This gluing point (3''') is represented in FIG. 7.

Figure 5:
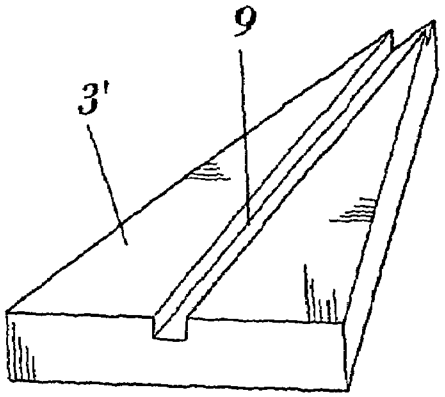
FIG. 5.—Shows a perspective view of a possible geometric configuration of the gluing points of the multiple sheets which make up the bag, and specifically, a gluing point of triangular configuration.
Figure 7:
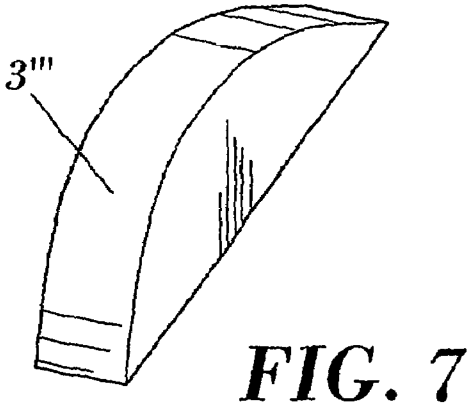
FIG. 7.—Shows a perspective view of a possible geometric configuration of the gluing points of the multiple sheets which make up the bag and, specifically, of a gluing point of a circular sector of reduced thickness.

Also, and with the objective of facilitating the evacuation of the spare glue, it is anticipated that the gluing points (3'), (3''), (3''') present a longitudinal groove (5), such as in FIGS. 5, 6 and 7.

Figure 2:
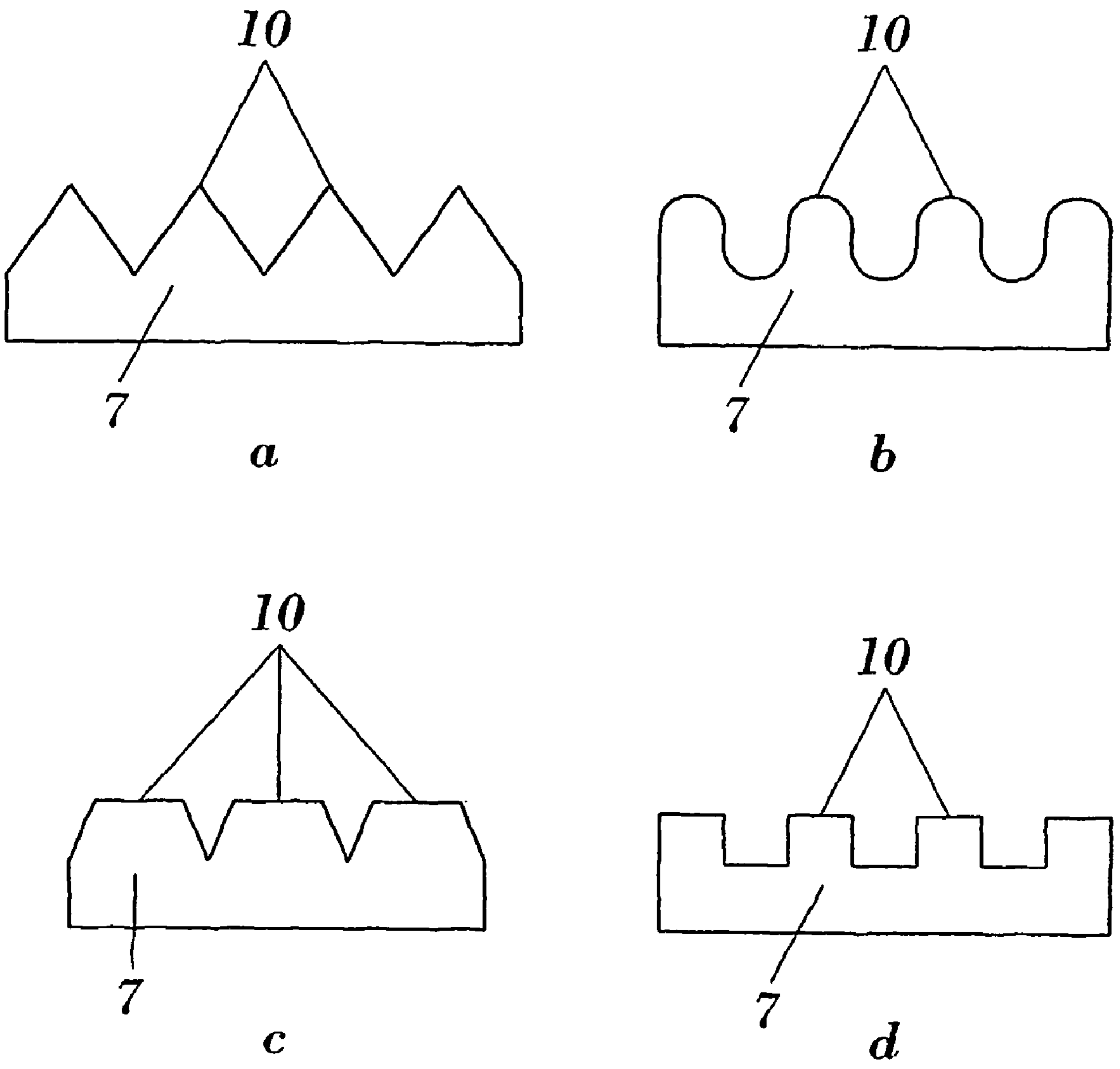
FIG. 2.—Shows a series of sections, corresponding to diverse configurations of the surface of the plate for the gluing of the bottoms of the bags.
Figure 3:
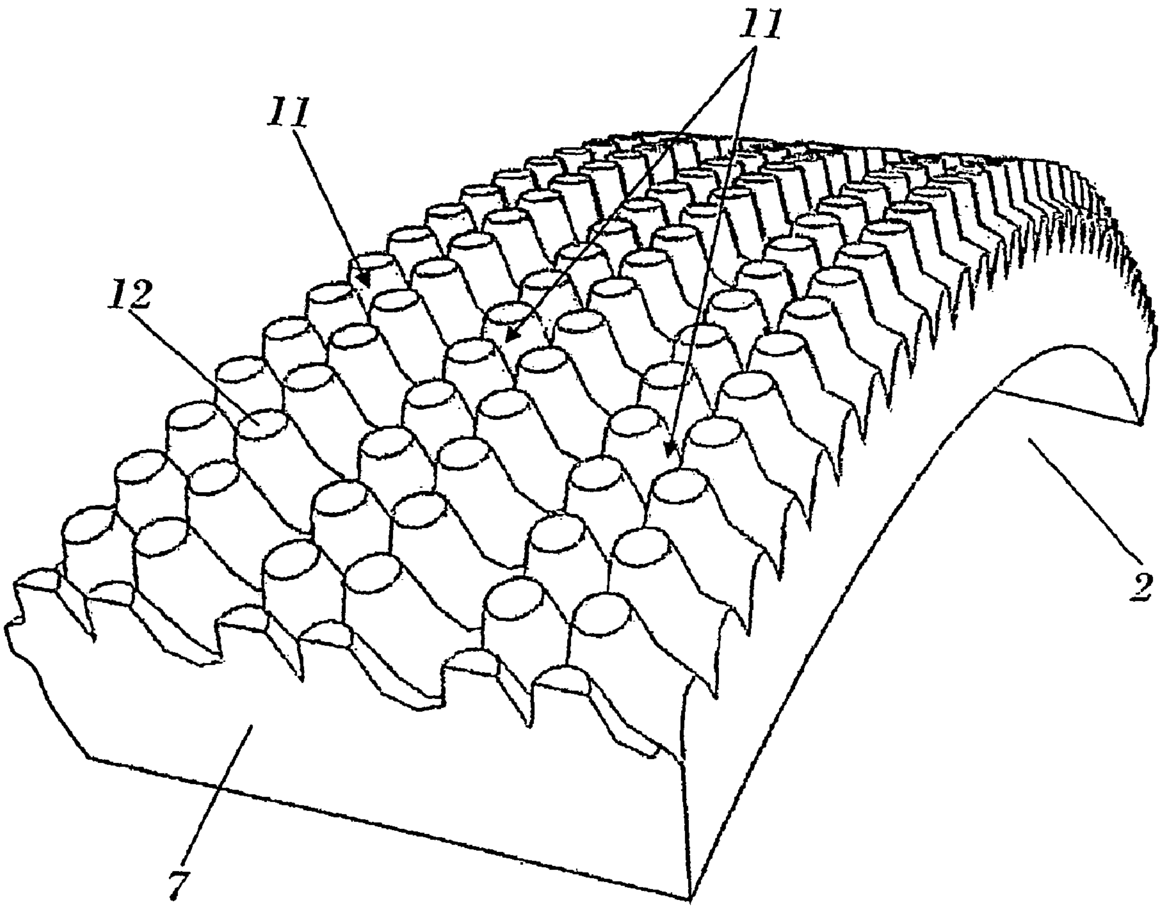
FIG. 3.—Shows a perspective of a plate composed of two rows of truncated conical protuberances.

In FIGS. 2 and 3, the corresponding longitudinal sections to diverse configurations of the plate used for the gluing of the bottoms are represented in phases c and d of to FIG. 1.

The plate (7) objective of the invention consists of a piece of plastic material or something similar which comprises a series of parallel rows (10) which define respective crests and valleys or grooves, so that the adhesive impregnates only the crests and the application of glue on the flap (5) and reinforcement strip (13) is produced forming parallel lines (6). In this way, a saving of glue is obtained which entails a greater speed of drying and an increase in production. The parallel rows (10) are arranged in the direction of the rotation of the gluing roller.

With this type of plate, the glue is distributed only on the crests, avoiding its coming off or spattering at high speeds from rotation of the roller, guaranteeing a uniform application of the adhesive on the flap.

The parallel rows can present diverse configurations, just as can be observed in FIG. 2, in which are represented rows with a triangular, undulating or square longitudinal section.

In FIG. 3 another embodiment of the plate (7) is represented which comprises a series of rows (11), composed of pairs of truncated conical protuberances (12) which further reduce the consumption of glue and moreover retain the glue in the plate (7) when the machine is stopped.

The invention claimed is:

1. A system for gluing a bag having multiple sheets, the bag having a body, a bottom, the bottom of the bag having flaps and a reinforcement strip, the system comprising:

a) a plate for gluing the flaps and reinforcement strip which constitute the bottom of the bag;
   wherein the plate has a plurality of parallel rows raising from the plate and forming a series of crests and valleys;
   wherein the crests are disposed longitudinally in the direction of rotation of a gluing roller applicator;
   wherein the glue only impregnates the crests;

b) gluing points mounted on a ruler guide to glue the sheets that form the body of the bag;

wherein the gluing points are raised from the surface of the ruler guide;

wherein the gluing points are interchangeable.

2. The system of claim 1 wherein the crest represents a triangular, undulate, square, rectangular, or slender section.

3. The system of claim 1 wherein the crest represents a truncated conical section.

4. The system of claim 1 wherein the gluing points are metallic and have a triangular configuration.

5. The system according to claim 4 wherein the gluing points are mounted on the ruler guide in a way that one of the vertices of the triangle faces the direction of the glue.

6. The system of claim 1 wherein the gluing points are plastic and have a circular configuration.

7. The system of claim 1 wherein the gluing points have a semi-circular configuration having a rectangular base, wherein the semi-circular gluing point remains in the vertical position on the ruler guide by standing on the rectangular base.

8. The system of claim 7 wherein the rectangular base has a smaller side of 2 mm in length.

* * * * *